Oct. 15, 1968   S. A. SCHLEUSENER   3,406,289
LASER SMALL-PARTICLE DETECTOR AND METHOD
Filed Nov. 10, 1965   2 Sheets-Sheet 1

INVENTOR:
STUART A. SCHLEUSENER
BY
Dawson, Tilton, Fallon, Lungmus & Alexander
ATT'YS

3,406,289
LASER SMALL-PARTICLE DETECTOR AND METHOD

Stuart A. Schleusener, Las Cruces, N. Mex., assignor to Iowa State University Research Foundation, Inc., Ames, Iowa, a corporation of Iowa
Filed Nov. 10, 1965, Ser. No. 507,194
4 Claims. (Cl. 250—217)

This invention relates to a laser small particle detector and method—more particularly, the use of a light amplification stimulated emission of radiation He-Ne apparatus for the detection of subsieve size particles (commonly considered to include particles below about 40 microns effective diameter).

A general object of the invention is to provide an apparatus and a method utilizing a gas laser for the detection of small particles and more specifically when the same are introduced under layered sedimentation conditions into the laser cavity. Other objects and advantages of the invention may be seen in the details of construction and operation set down in this specification.

The invention is explained in conjunction with the accompanying drawing, in which—

Figure 6:
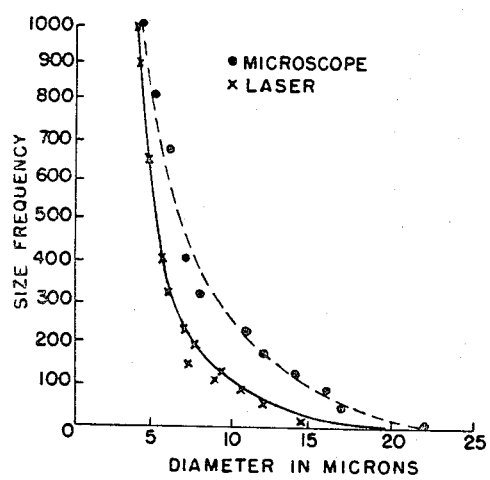
Figure 7:
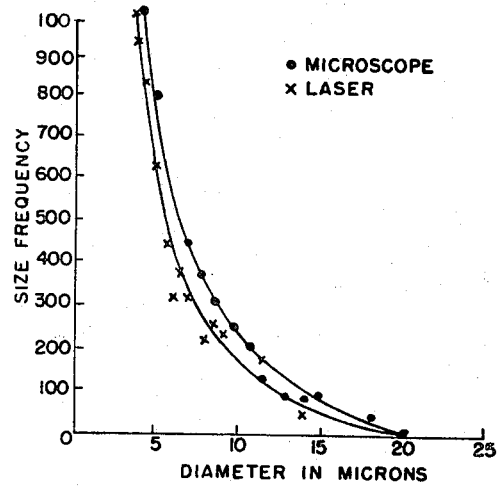

FIG. 6 is a graph of particle size distribution determination for talc powder; and FIG. 7 is a graph of the particle size distribution determination for the smaller particles in S. S. White airbrasive powder.

Figure 1:
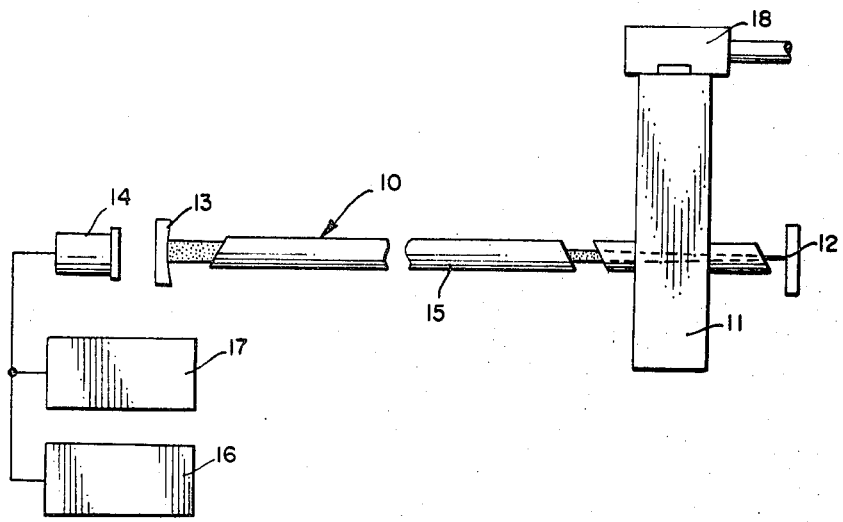
FIG. 1 is a diagram of the single particle laser detector and sedimentation system employed in the practice of the invention.

In the illustration given and with reference to FIG. 1, a visible Helium-Neon laser 10 with its low gain is very sensitive to disturbances in its optical cavity 11. A laser with one plain mirror 12 and one spherical mirror 13 operating in the simple $TEM_{oon}$ mode is particularly sensitive to such disturbances even from particles as small as three microns or less in diameter. When such particles fall through the cavity beam, a cavity disturbance is created which results in a very substantial decrease in laser output as detected by a photo multiplier 14. If the particle is more than eight microns in diameter, the beam may be completely quenched by the presence of the particle in its path. The laser can thus be used as a very sensitive real-time detector of small single particles.

We have found by the use of layered sedimentation techniques in a gaseous medium this single particle detection capability can be utilized in a quite simple system as a means of obtaining the particle size distribution of a particle sample. Because of the sensitivity of a system of this type, only very low particle concentrations are used, e.g., 100–200 particles/cm.$^3$ initial concentrations.

Layered sedimentation

Layered sedimentation is based on Stokes' law which gives as the limiting velocity of fall of a spherical particle settling in a viscous medium the expression $$v = \frac{2(\rho_D - \rho_m)g}{9n}r^2$$

where $r$ is the radius of the particle, $\rho_D$ is the density of the particle, $\rho_m$ is the density of the medium, $n$ is the viscosity of the medium, and $g$ is the acceleration due to gravity. This expression shows that the limiting velocity of fall is directly proportional to the cross-sectional area of the particle.

Sinclair [1] states that Stokes' law is correct to five percent or better for spherical particles in the radii range of one to fifty microns settling in air. Above fifty microns the velocity becomes so large that considerable turbulence is produced. This results in a lower limiting velocity than that predicted by Stokes' law. Below one micron the particle size begins to become comparable with the mean free path of the air molecules permitting the particle to fall faster than predicted. Both of these factors can be compensated by the introduction of appropriate correction terms into Stokes' law as stated above.

Irani and Callis [2] consider the question of non-spherical particles and conclude that Stokes' law can be utilized, in general, if the ratio of the particle's maximum length to its minimum width is less than four. Non-spherical particles can be regarded as having an effective Stokes' radius equal to that of a sphere of the same density and mass. As used herein, such particles will be considered to have a diameter equal to that of a sphere having the same density and the same settling time.

Stokes' law is concerned only with the limiting velocity of a particle falling in a viscous medium. A certain time must elapse before this velocity is reached. For particle diameters in the subsieve range, i.e., diameters of less than about 40 microns, this transient time is negligible in comparison to settling time.

For Stokes' law to be valid in a physical system, the particles should fall as they would if they were isolated in an unlimited turbulence-free medium. For particles in the subsieve range, this means that the diameter of all containing vessels should be in the order of centimeters and that particle concentrations should be sufficiently low that particle interaction does not occur and that the effects of particle concentration on the viscosity of the medium is insignificant.

Figure 2:
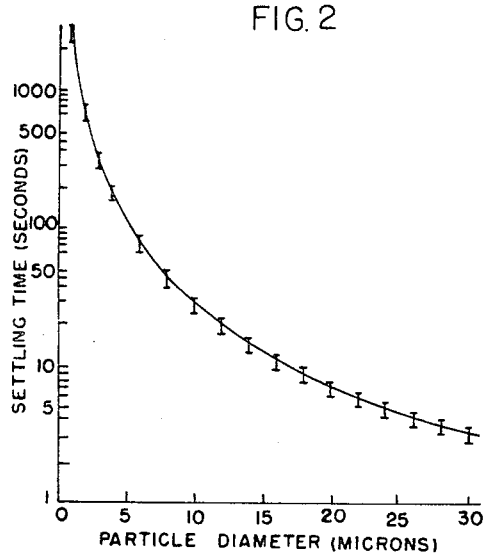
FIG. 2 is a chart of the calculated settling time as function of particle diameter for spherical particles of 2.5 specific density falling a distance of 21 centimeters in air. The settling time variation for a particle falling 23 centimeters and another 19 centimeters is indicated by vertical bars straddling the curve representing average settling times for a number of particle sizes.

Layered sedimentation involves insertion of a properly dispersed representative sample of material at some point along a sedimentation column. As the particles settle, each particle size falls with a velocity given by Stokes' law. As the particles fall they become separated along the length of the sedimentation column according to their size. If the time required for each size to reach a specific position down the length of the column is considered, it is seen that they are also separated timewise. It is this timewise separation that is conveniently measured by the laser detecting system. FIGURE 2 shows a calculation of the times required for spherical particles of various diameters and of a specific density of 2.5 to settle a distance of 21 cm. Since insertion chambers have definite dimensions, the minimum-to-maximum settling times for an insertion chamber 4 cm. deep is also indicated, by the I shaped bars in FIG. 2.

Details of laser detector system

FIGURE 1 is a diagram of the detection system used

---
[1] D. Sinclair, "Stability of Aerosols and Behavior of Aerosol Particles," in "Handbook on Aerosols," pp. 64–76. U.S. Atomic Energy Commission: 1950.

[2] R. R. Irani and C. F. Callis, "Particle Size: Measurement, Interpretation, and Application," New York, N.Y., John Wiley and Sons, Inc.: 1963.

in the studies reported here. The laser 10 was an RF excited He-Ne type operating in the visible red at a wavelength of 6328 angstroms. The tube 15 was quartz, about 90 cm. long and 6 mm. inside diameter, with Brewster angle windows at each end. The mirrors 12 and 13 consisted of thirteen dielectric layers on quartz, one mirror being flat and the other spherical with a focal length of 60 cm. (the radius of curvature being twice the focal length or 120 cm.). The mirrors were placed about 120 cm. apart. Reflectivity of the mirrors was in excess of 99 percent with transmission being about 0.5 percent.

Figure 3:
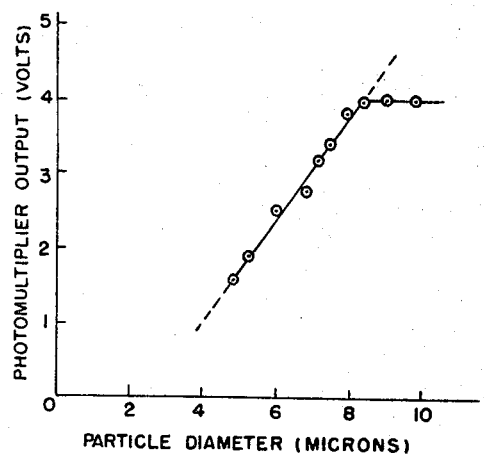
FIG. 3 is a chart of photo multiplier output in volts as a function of the diameter (in microns) of a glass sphere falling through the cavity beam. Particles larger than about 8 microns completely quench the beam.

The sedimentation chamber 11 was located in the laser cavity. Brewster angle windows isolated the medium inside the chamber from the turbulence of the outside air. Operating in the $TEM_{oon}$ mode the laser beam inside the sedimentation column was very slightly conical with an average diameter of somewhat less than 1 mm. The photo multiplier 14 at the spherical mirror end of the laser tube detected the change in laser output. The output signal from the photo multiplier could be fed to an oscilloscope 16 and/or to an electronic counter 17. As the particle passes through the beam and reduces the laser output, the negative output voltage of the photo multiplier becomes less negative making the observed output pulses on the oscilloscope 16 appear positive. For sufficiently large particles falling through the center of the beam, the laser is completely quenched. These large particles gave an output change of approximately 4 volts. Smaller pulses did not completely quench the laser. FIGURE 3 shows a plot of photo multiplier output change as a function of particle size as determined by a time of arrival analysis of oscillograms. Only pulses of full amplitude in a given time range were considered since partial height pulses correspond to particles falling through the edges of the beam. FIG. 3 indicates that in the specific system tested, particles in excess of about 8 microns quenched the beam, the beam being about one millimeter in diameter. This illustrates the sensitivity of the system wherein only 8 parts out of 1000 is effective to quench the beam—alternatively 64 parts out of 1,000,000 on a cross-sectional basis.

*Particle size distribution tests*

To test the practicability of a laser single particle detector as a part of a working system, particle size distributions were determined for several types of particles. All particles were dispersed by using them to replace the abrasive particles in an S. S. White airbrasive unit, Model C. The particles were injected through a cutting head nozzle of the airbrasive unit into an insertion chamber 18 immediately above the sedimentation chamber. The insertion chamber had a number of baffles to damp out air turbulence resulting from particle injection. After a momentary delay, a trap door was opening the floor of the insertion chamber permitting the particles to settle into the sedimentation chamber.

Four different types of particles were used as test samples, namely, glass spheres with a nominal 0–10 micron distribution range, glass spheres with a nominal 10–20 micron distribution range, talc powder, and S. S. White airbrasive powder. For each type of particle a microscope count was made for use as a comparison standard. There are a number of difficulties present in microscope counting including the fact that the smaller particles are only a few wavelengths of light in dimensions. In addition, the talc and airbrasive particles are nonspherical making it necessary to estimate their effective diameter. Thus, a number of errors are involved in the microscope count. Consequently, the comparison standard that it provides is not an absolute standard.

To get a particle size distribution curve from such data it is only necessary to determine the number of particles, N, that have passed the beam between any two times, $t_1$ and $t_2$. Combining Stokes' Settling Law and sedimentation chamber geometry, the associated diameters $d_1$ and $d_2$ corresponding to times $t_1$ and $t_2$ can be calculated from $$d = \frac{18_n}{(\rho_p - \rho_m)g} \frac{L^{1/2}}{t}$$

where L is the sedimentation chamber length, and is the settling time. The other quantities have already been defined. Then, $d_1 - d_2 =$ particle diameter span $\frac{N}{d_1 - d_2} =$ particles per micron Plotting the number of particles per micron versus the average particle diameter $(d_1+d_2)/2$ gives the size frequency distribution curve for the particulate.

When the laser system was used to determine particle sizes, an electronic counter was connected to the output of the photomultiplier to record the accumulated particle count. Since there was no automatic print-out available on this counter, the electronic counter scale was read at stated intervals, but without stopping the counter. This tended to give a number of errors for large size particles since in the system used the time spread between 19 micron and 20 micron particles is less than one second. As the particle size decreased, the counter reading accuracy improved. If large particles are to be examined, the length of the sedimentation column should be increased.

Figure 4:
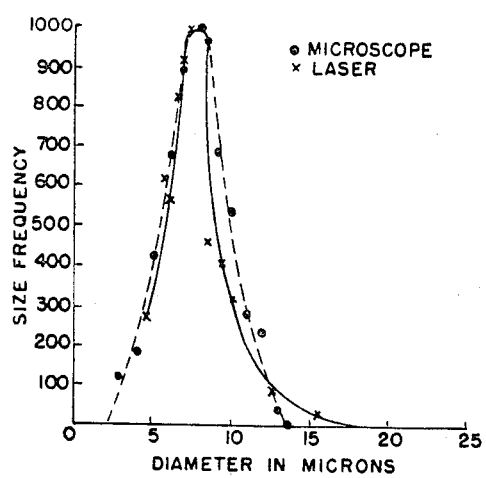
FIG. 4 is a graph of the particle size distribution determination for 0–10 micron glass spheres.
Figure 5:
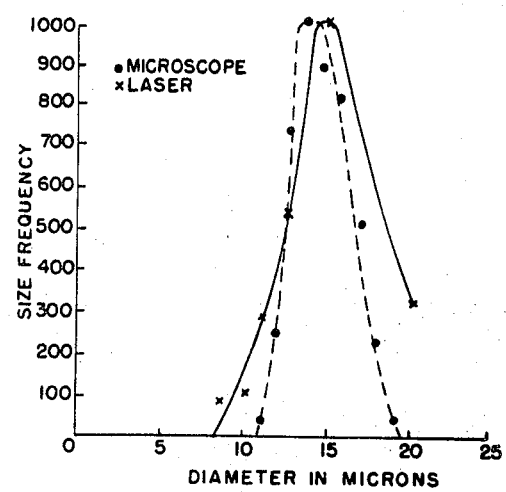
FIG. 5 is a chart of the particle size distribution determination for 10–20 micron size glass spheres.

FIGURE 4 is a comparison between laser counting and microscope counting of the 0–10 micron glass spheres while FIGURE 5 is a comparison between laser counting and microscope counting for the 10–20 micron glass spheres. FIGURE 6 is a similar comparison for talc powder and FIGURE 7 for S. S. White airbrasive powder. Larger particles are present to do the main cutting work in this powder, but for the sake of the experimentation herein, only the smaller particles were measured.

The results shown in FIGURES 4 to 7 are quite good in view of the potential errors both with respect to microscope counting and electronic scale reading. From these results, it is evident that a laser can be used as a sensitive detector of small single particles. Used with a layered sedimentation system it can be used to determine particle size distributions of subsieve particles. The ultimate lower limit has not yet been established.

Techniques for particle detection and particle size determination along the lines discussed here have a number of advantages over other types of particle detection and size determination techniques, e.g., (a) initial dispersion problems are minimized by the use of a low initial particle density, e.g., 100–200 particles/cm.³.
(b) there is no particle scattering coefficient that needs to be determined beforehand.
(c) light absorption by the particle only enhances the output pulse and does not effect the final results.
(d) data conversion from accumulated counts to size distribution is simple and straightforward and could be done automatically by an electronic counter print-out at specific predetermined times.
(e) this technique offers the possibility of a real-time on-line automatic system for particle detection and/or size determination for safety control, quality control, and/or process control.

Although the experimental work described herein was done in an air medium, there is interest in such a system which would count particles in a fluid medium.

The output sensitivity of a visible H-Ne gas laser to disturbances in its optical cavity, even by a particle of only a few microns in diameter, has been utilized as a means of individual particle counting. Stokes' Settling Law indicates that a collection of different sized particles inserted simultaneously into a gaseous sedimentation chamber will fall at different velocities and will, therefore, fall a fixed distance in different times. Using a laser as an ultrasensitive detector, particle size distributions in good agreement with microscope counts have been obtained. Individual particles three microns and larger were readily detectable with the lower limit to particle size not established. The invention can be used to advantage in particle detection in other media than gas, such as liquid.

While in the foregoing specification, we have set down a detailed description of the invention, many variations in the details herein given may be made by those skilled in the art without departing from the spirit and scope of the invention.

I claim:

1. An apparatus for detecting particles of sub-sieve size comprising a cavity-equipped gas laser, means coupled to said cavity for introducing said particles thereinto and means coupled to said laser for detecting the change in laser output.

2. The apparauts of claim 1 in which the introducing means introduces said particles under layered sedimentation conditions, whereby said apparatus is adapted to report particle size distribution information.

3. A method for detecting subsieve-sized particles comprising introducing said particles into the cavity of a gas laser, and detecting instantaneous changes in laser output.

4. The method of claim 2 in which concentration of particles is of the order of 100–200 particles per cm.$^3$ and the said cavity has dimensions of the order of centimeters.

References Cited

Schleusener and Read, "A Gas Laser Small Particle Detector," IEEE National Proc. Electronics Conf., Proc. 21 (1965), pp. 186–190.

RALPH G. NILSON, *Primary Examiner.*

M. A. LEAVITT, *Assistant Examiner.*